(12) United States Patent
Hergesell et al.

(10) Patent No.: US 8,763,942 B2
(45) Date of Patent: Jul. 1, 2014

(54) GRINDER FOR A COFFEE MACHINE

(75) Inventors: Harald Hergesell, Jegenstorf (CH); Peter Arndt, Blaustein (DE); Ciro Caputo, Urspring (DE); Martin Grupp, Deizisau (DE); Helmut Stohrer, Ulm (DE); Jochen Gussmann, Schwäbisch Gmüd (DE); Alexander Kiefer, Kuchen (DE); Armin Startz, Weidenstetten (DE)

(73) Assignee: Schaerer AG, Zuchwil (CH)

( * ) Notice: Subject to any disclaimer, the term of this patent is extended or adjusted under 35 U.S.C. 154(b) by 220 days.

(21) Appl. No.: 13/389,831

(22) PCT Filed: Aug. 12, 2010

(86) PCT No.: PCT/EP2010/061766
§ 371 (c)(1),
(2), (4) Date: Feb. 10, 2012

(87) PCT Pub. No.: WO2011/020771
PCT Pub. Date: Feb. 24, 2011

(65) Prior Publication Data
US 2012/0138721 A1    Jun. 7, 2012

(30) Foreign Application Priority Data
Aug. 21, 2009 (EP) ..................................... 09168396

(51) Int. Cl.
*B02C 23/00* (2006.01)
*B02C 13/20* (2006.01)

(52) U.S. Cl.
USPC ....................................... 241/100; 241/261.2

(58) Field of Classification Search
USPC ............................ 241/37, 100, 261.2, 261.3
See application file for complete search history.

(56) References Cited

U.S. PATENT DOCUMENTS 2,229,031 A * 1/1941 Anderson et al. .......... 241/259.1
4,605,175 A * 8/1986 Weber ............................. 241/56
(Continued)

FOREIGN PATENT DOCUMENTS

| CN | 201 067 340 | 6/2008 |
|---|---|---|
| EP | 0 676 162 A1 | 10/1995 |
| EP | 1 994 866 A1 | 11/2008 |

OTHER PUBLICATIONS

International Search Report dated Sep. 24, 2010.

*Primary Examiner* — Faye Francis
(74) *Attorney, Agent, or Firm* — Pearne & Gordon LLP

(57) ABSTRACT

A grinder for a coffee machine includes a first grinding disc disposed in a housing. A drive moves the first grinding disc about a rotational axis. A second grinding disc is disposed in the housing. There is a threaded part in which the second grinding disc is attached. The threaded part is screwable into the housing. A drive wheel is disposed coaxially with respect to the threaded part and rotates the threaded part with respect to the housing. A grinding gap between the two grinding discs is thereby able to be set. A setting wheel co-operates with the drive wheel, the setting wheel being attached to the housing. A supply opening is disposed in the housing for supply of coffee beans to be ground. A path guide opening guides away the coffee ground between the two grinding discs. A holder is adjustably attached to the housing and is fixable in any position. The setting wheel which is attached to the holder can engage the drive wheel in any desired position with respect to the housing, whereby the grinder can be inserted into different types of coffee machines.

9 Claims, 7 Drawing Sheets

(56) References Cited

U.S. PATENT DOCUMENTS

| | | | |
|---|---|---|---|
| 4,925,150 A * | 5/1990 | Tedioli | 241/169.1 |
| 4,967,649 A * | 11/1990 | Ephraim et al. | 99/286 |
| 5,707,019 A * | 1/1998 | Aikawa | 241/261.2 |
| 7,874,505 B1 * | 1/2011 | Lassota | 241/36 |
| 8,297,546 B2 * | 10/2012 | Mazzer | 241/259.1 |
| 2004/0200912 A1 * | 10/2004 | Park | 241/37 |
| 2010/0037778 A1 * | 2/2010 | Remo | 99/286 |
| 2010/0170971 A1 * | 7/2010 | Doglioni Majer | 241/30 |
| 2012/0001005 A1 * | 1/2012 | Kroesen et al. | 241/257.1 |
| 2012/0228418 A1 * | 9/2012 | Mazzer | 241/290 |
| 2013/0115351 A1 * | 5/2013 | Van Os et al. | 426/433 |

* cited by examiner

GRINDER FOR A COFFEE MACHINE

The present invention relates to a grinder for a coffee machine, comprising a housing, in which a first grinding disc is disposed, which is drivable about a rotational axis via drive means, and comprising a second grinding disc, which is attached in a screw-in part, which screw-in part is screwable into the housing and is rotatable with respect to the housing via adjusting means, the grinding gap between the two grinding discs being thereby able to be set, which adjusting means are formed by a drive wheel disposed coaxially with respect to the screw-in part, which drive wheel co-operates with a setting wheel rotatable via setting means, which setting wheel is fixed to the housing, and comprising a supply opening disposed in the housing for supply of the coffee beans to be ground and a path guide opening for guiding away of the coffee ground between the two grinding discs.

Grinders of this type for coffee machines are known. For example, EP-A 0676162 shows such a grinder. With such grinders, the coffee beans are guided between the two grinding discs, the one grinding disc is driven in rotation via drive means, the other grinding disc is stationary, the coffee beans are ground into coffee powder between these grinding discs, the ground coffee powder emerges radially out of the grinding gap and is fed via an outlet to the brewing chamber of a coffee machine, for example.

In order to be able to set the fineness of the ground powder, the stationary grinding disc allows itself to be moved toward the driven grinding disc or respectively away from the latter, for which purpose this stationary grinding disc is attached to a screw-in part, which is screwable into the housing. This screw-in part is provided with a drive wheel which can be rotated with respect to the housing via an adjusting actuator.

Grinders of this kind are supposed to be able to be inserted into as many different coffee machine types as possible. The path guide opening for the ground coffee powder aligned radially with respect to the grinding discs is thereby determined; the adjusting actuator for the drive wheel for setting the width of the gap between the grinding discs is firmly installed on the housing with respect to the path guide opening. Depending upon how the space relations are arranged on the different coffee machine types, this adjusting actuator has to be placed in different positions with respect to the path guide opening for the ground coffee, which has the consequence that there must exist a possibility of selection of correspondingly designed grinders, which increases the production costs for these grinders and the costs for keeping them in stock.

The object of the present invention is to design a grinder for a coffee machine in such a way that the setting wheel with the adjusting actuator for setting the grinding gap between the two grinding discs with respect to the path guide opening, which opening is in a fixed position on the housing, can be brought into any desired position and fixed.

This object is achieved according to the invention in that the setting wheel is disposed on a holder which is attached to the housing and which is adjustable with respect to the housing and is fixable in any position.

A standardized grinder can thereby be produced for different coffee machine types. Depending upon the space relations in the coffee machine, the setting wheel can be brought into a corresponding position and can be fixed in this position.

Preferably the setting wheel is disposed on an annular holder which encloses the housing and which is rotatable with respect to the housing and is fixable in any position, whereby a simple construction and a simple adjustability of the setting wheel is achievable.

Preferably the setting wheel is rotatably borne in a mounting bracket, which mounting bracket is attached to the annular holder. Achieved thereby is that the annular holder can be put on the housing above or below the drive wheel, and that the setting wheel comes into contact with the drive wheel in an optimal way.

Preferably, the annular holder is designed as tension ring which is fixable in the set position via tensioning means, which results in a very simple construction and manufacture of the annular holder, which is mountable on the housing in a simple way.

Preferably the tensioning means comprise a tension screw by means of which the tension ring is tensionable on the peripheral surface of the housing, which results in an especially easy manipulation during assembly.

The annular holder can be made up of a ring which is provided with a contoured pattern extending over at least a portion of the circumference, which contoured pattern engages in a contoured pattern provided in a corresponding way on the periphery of the housing. Achieved through this contouring is a holding, in a way secured against turning, of the annular holder on the housing in a position able to be preset.

The adjustment of the setting wheel can be carried out by means of a plug-in tool able to be manipulated by hand, which plug-in tool is provided with a plug-in shape that is able to be inserted into a correspondingly shaped opening of the setting wheel. The setting wheel can however also be driven by motor; the drive wheel can thereby be brought into the desired position in a controlled way.

Preferably the drive wheel is designed as worm wheel and the setting wheel as worm gear, which results in a particularly simple adjustment mechanism.

Embodiments of the invention will be explained more closely in the following, by way of example, with reference to the attached drawings.

Figure 4:
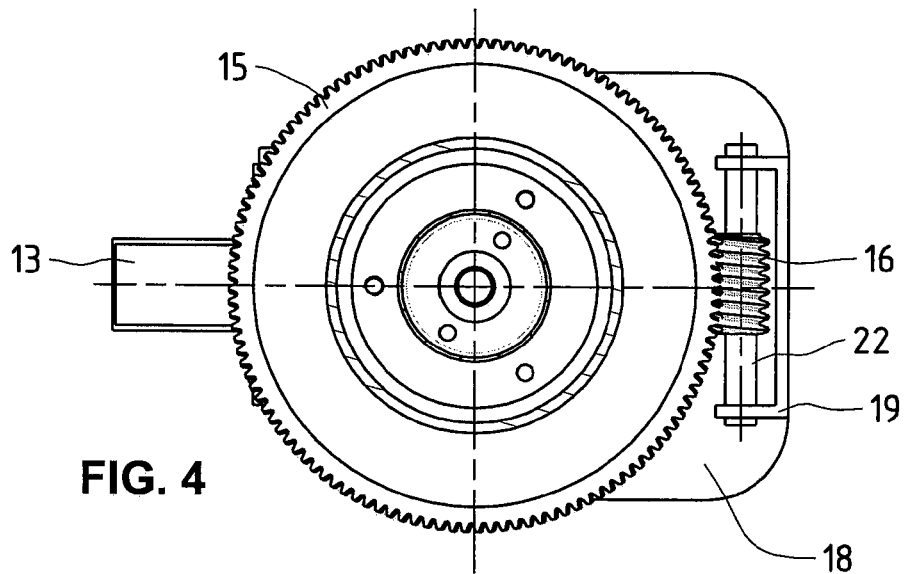
Figure 5:
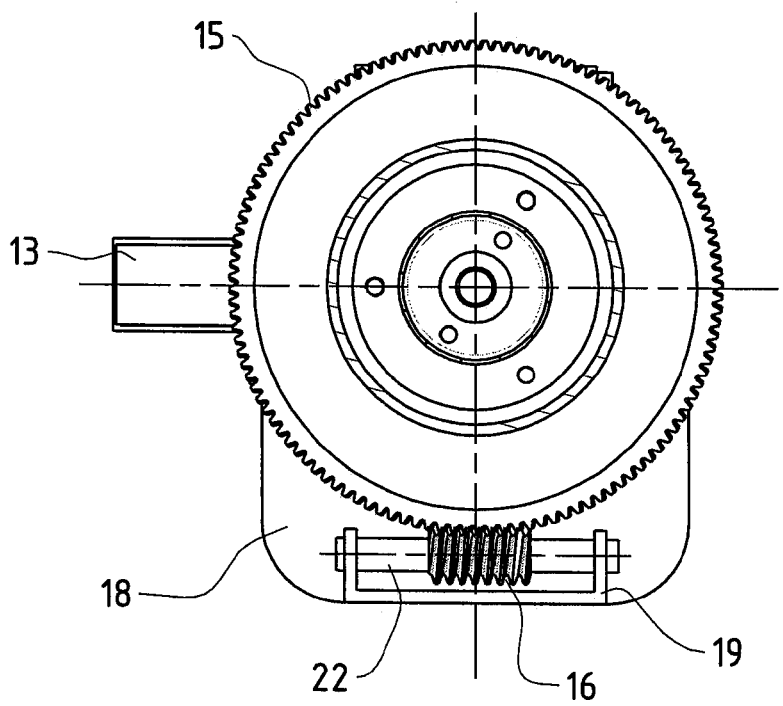
Figure 6:
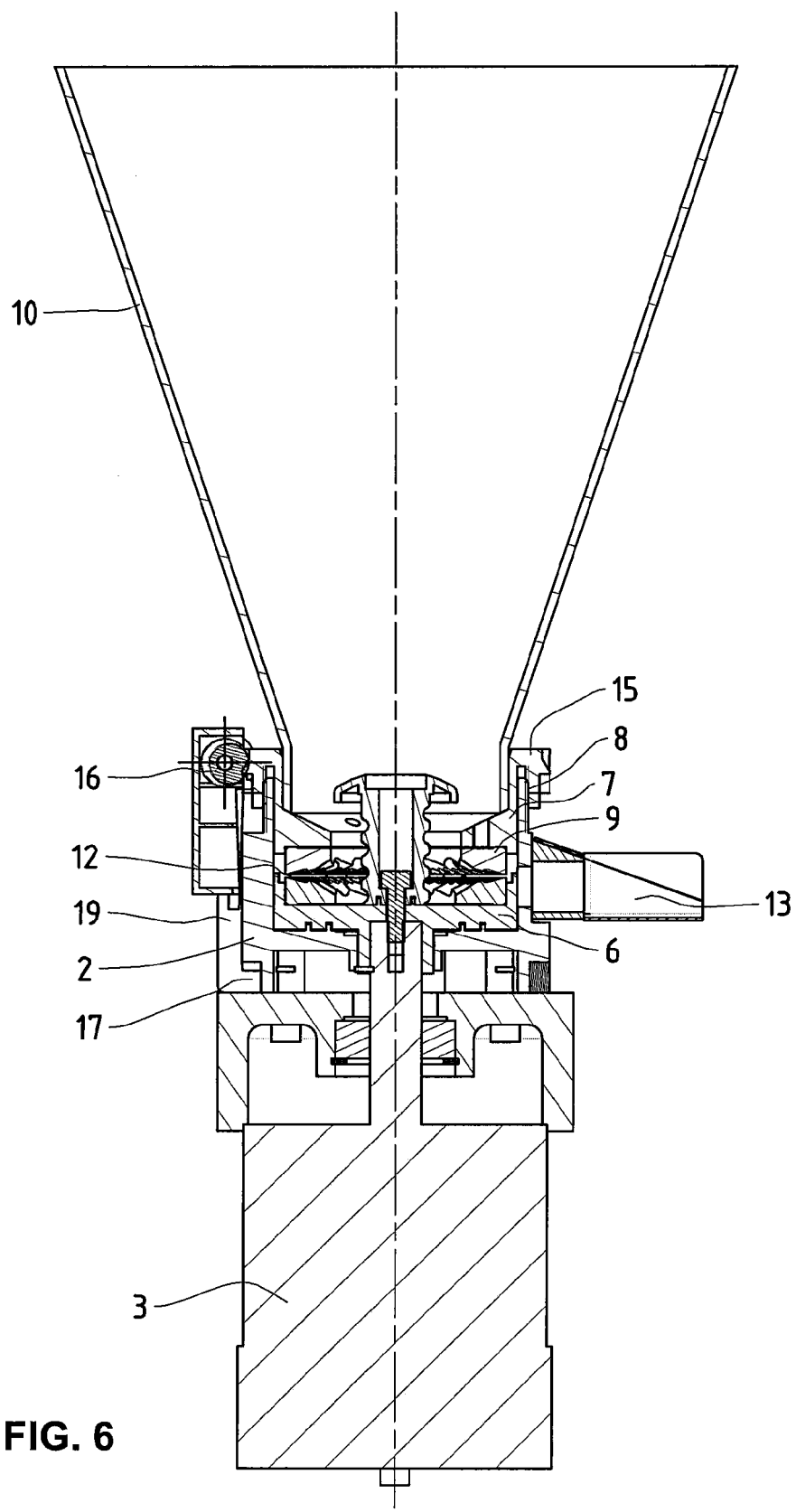
Figure 7:
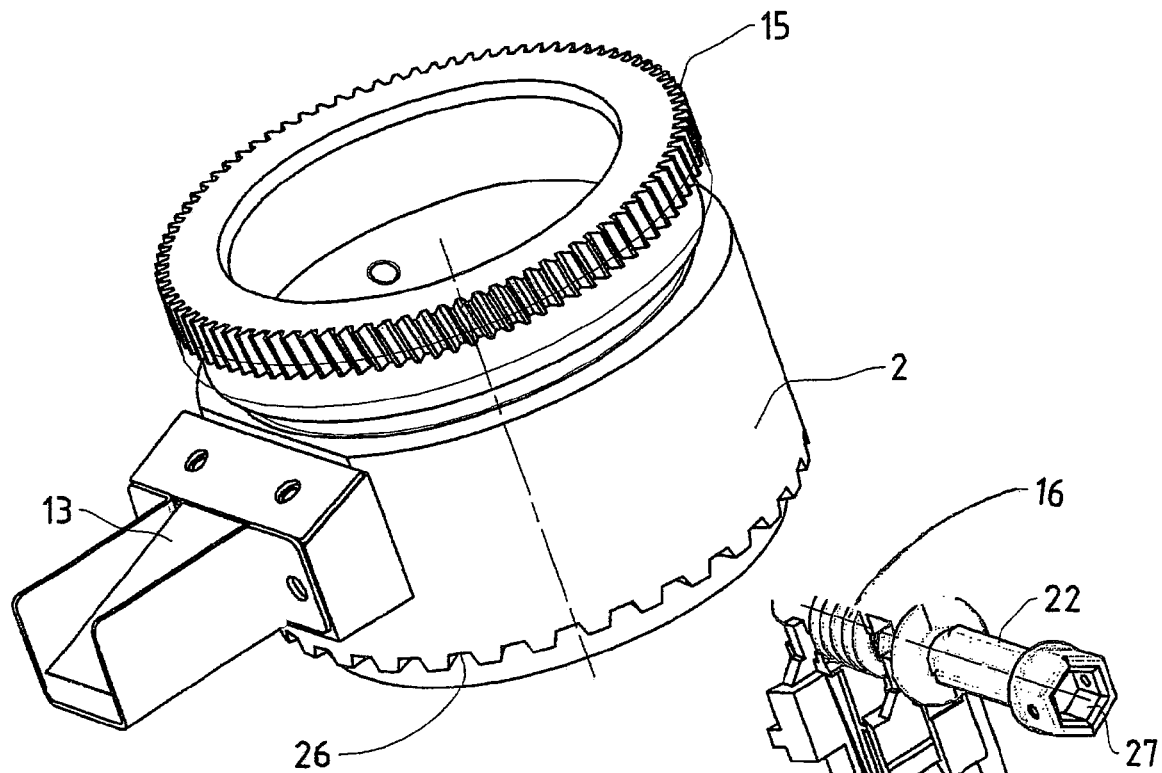
Figure 7:
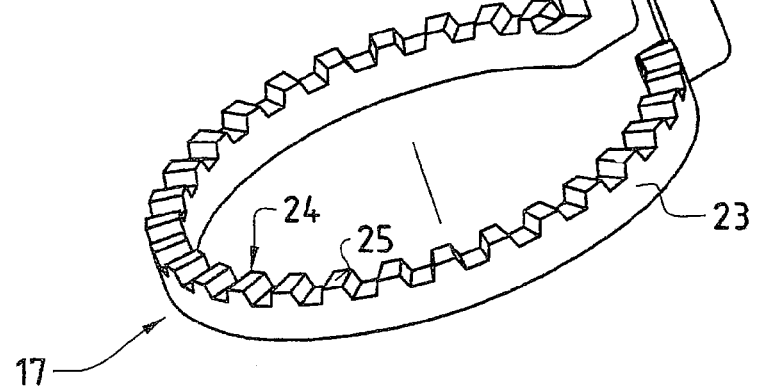
Figure 8:
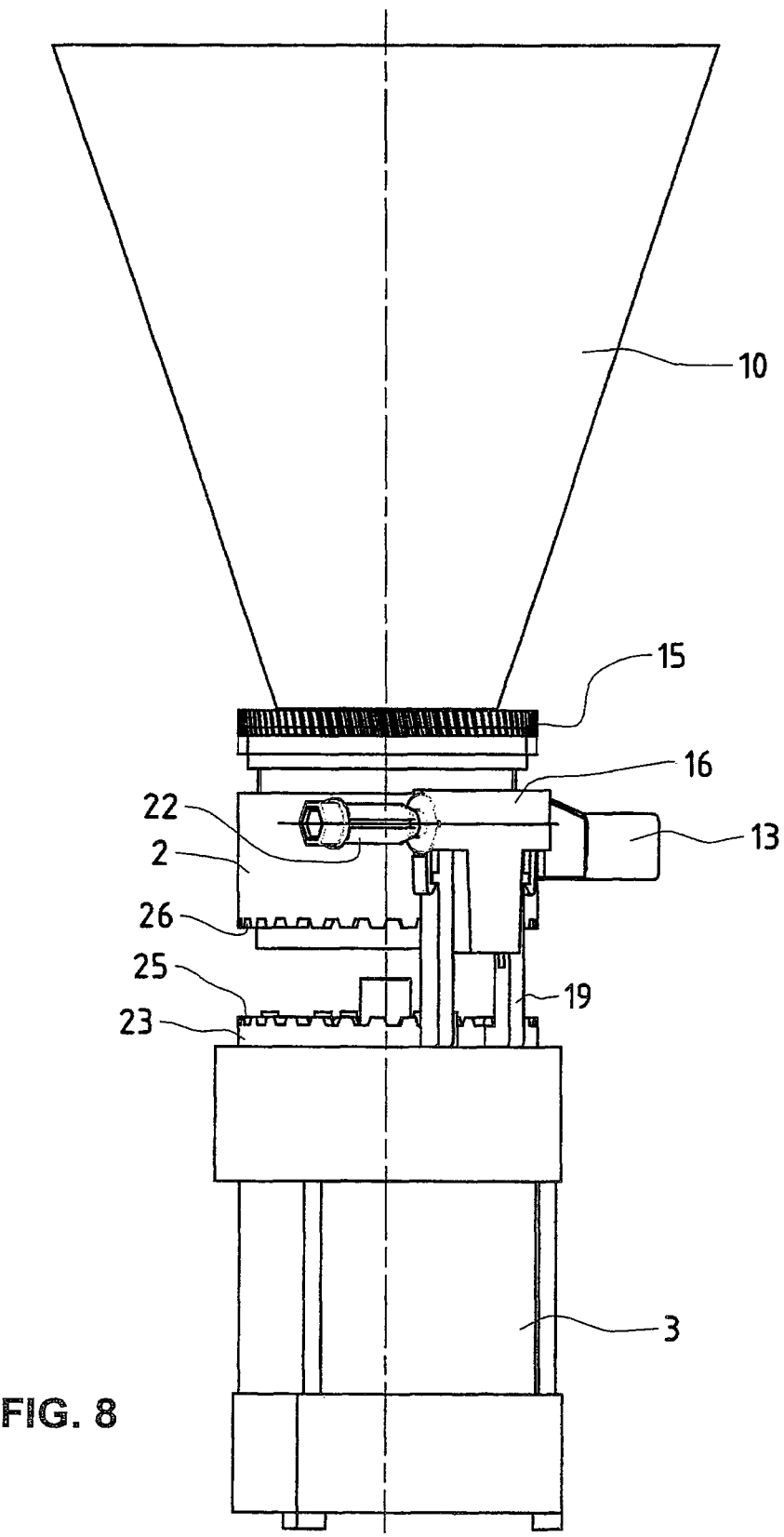

FIG. 4 and FIG. 5 each show a view of the drive wheel of the grinder with setting wheels disposed in different positions;

FIG. 6 is a sectional representation of a grinder with another embodiment of an annular holder;

FIG. 7 shows in a three-dimensional representation the annular holder according to FIG. 6 with the corresponding housing portion of the grinder belonging thereto;

FIG. 8 is a view of the grinder according to FIG. 6 with housing raised in order to be able to position the annular holder.

Figure 1:
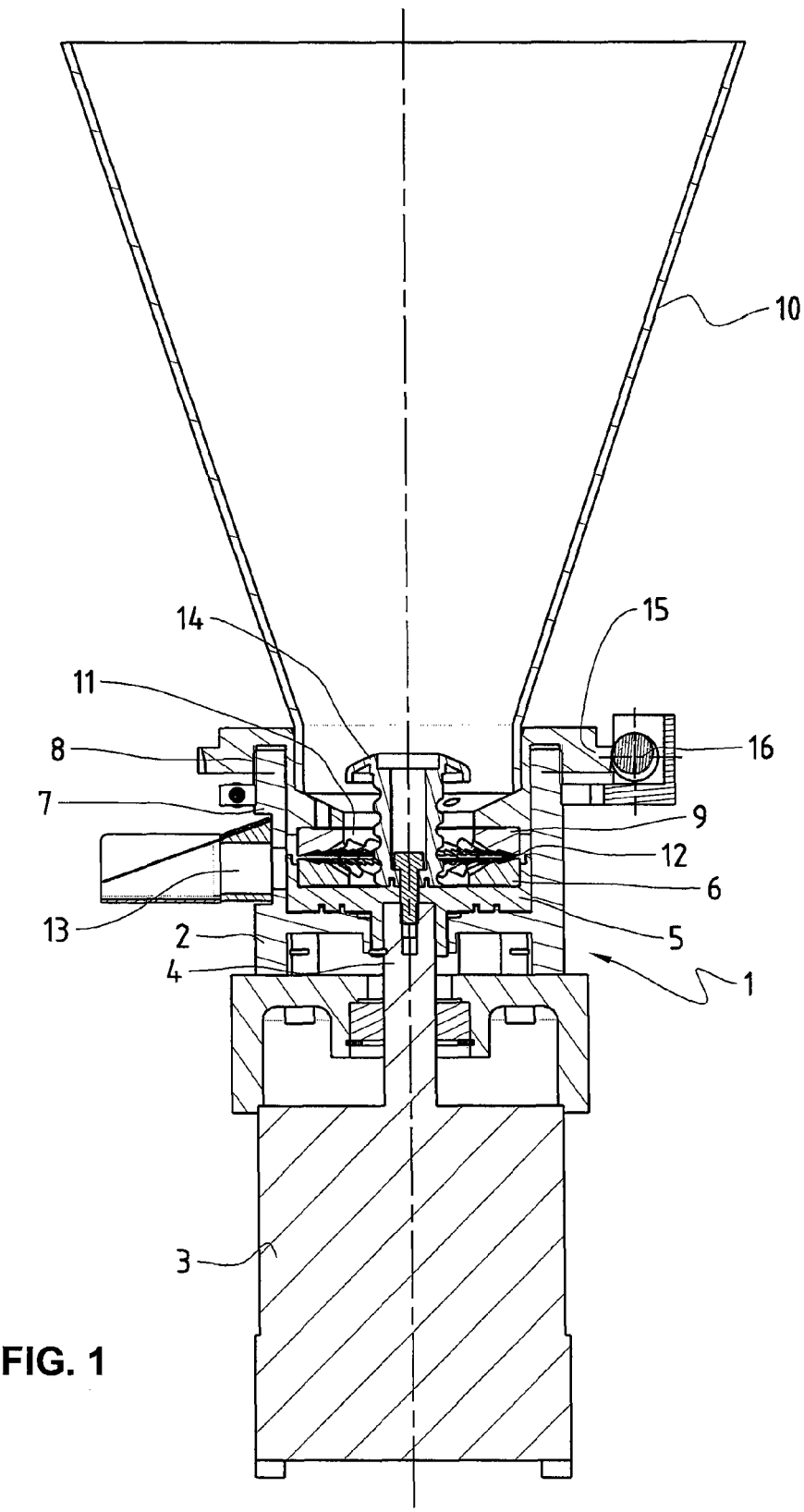
FIG. 1 shows a sectional view through a grinder with a first embodiment of an annular holder for the setting wheel.

As can be seen from FIG. 1, the grinder 1 comprises a housing 2, on which an electromotor 3 is flange-mounted in a known way.

Placed on the shaft 4 of the electromotor 3 is a receiving part 5, in which the first grinding disc 6 is inserted and fixed.

Screwed into the housing 2 is a screw-in part 7, for which purpose the housing 2 and the screw-in part 7 are each provided with a corresponding threaded portion 8. The second grinding disc 9 is fixed to the screw-in part 7 in such a way that it is disposed coaxially to, and opposite from, the first grinding disc 6. The two annular surfaces turned toward each other of the first grinding disc 6 and of the second grinding disc 9 are provided in a known way with cutting edges. Moreover the grinding discs 6 and 9 are designed spherical and beveled.

Placed on the screw-in part 7 is a funnel 10, into which the coffee beans to be ground can be filled. During the grinding step, via a coaxial opening 11, which is made in the second grinding disc, these coffee beans arrive in the grinding gap 12 formed by the two grinding discs 6 and 9. During rotation of the first grinding disc 6, the coffee beans are moved from the center to the periphery of the two grinding discs 6 and 9; on the way the coffee beans are reduced to coffee powder. The known powder ejectors (not shown) which are disposed on the periphery of the first grinding disc 6, push the coffee powder to the path guide opening 13, disposed on the housing, through which the ground coffee powder is led away in a compressed state in order to be conducted into a brewing chamber of a coffee machine, for example. By means of a mushroom-shaped element 14, fixed in the center of the first grinding disc 6, an operator of this grinder is prevented from being able to reach into the grinding gap 12 and thereby reach the two grinding discs 6 and 9, for example through the funnel 10 and the coaxial opening 11.

Attached to the threaded portion 8 is a drive wheel 15 which is designed as worm wheel in the present embodiment example. The worm wheel 15 can be turned via a setting wheel 16 meshing therewith, the setting wheel 16 being designed in this embodiment example as worm gear. As will be described later in detail, the setting wheel 16 is disposed in an annular holder 17 that encloses the housing 2 and is fixed thereto.

Through rotation of the setting wheel 16, the drive wheel 15, and together therewith the threaded portion 8, is turned with respect to the housing 2. With turning of the screw-in part 7, this part is screwed into the housing 2 or screwed out of the housing, whereby the grinding gap 12 changes. The grinding gap 12 can thereby be set, whereby different degrees of fineness of the ground coffee powder can be obtained.

Figure 2:
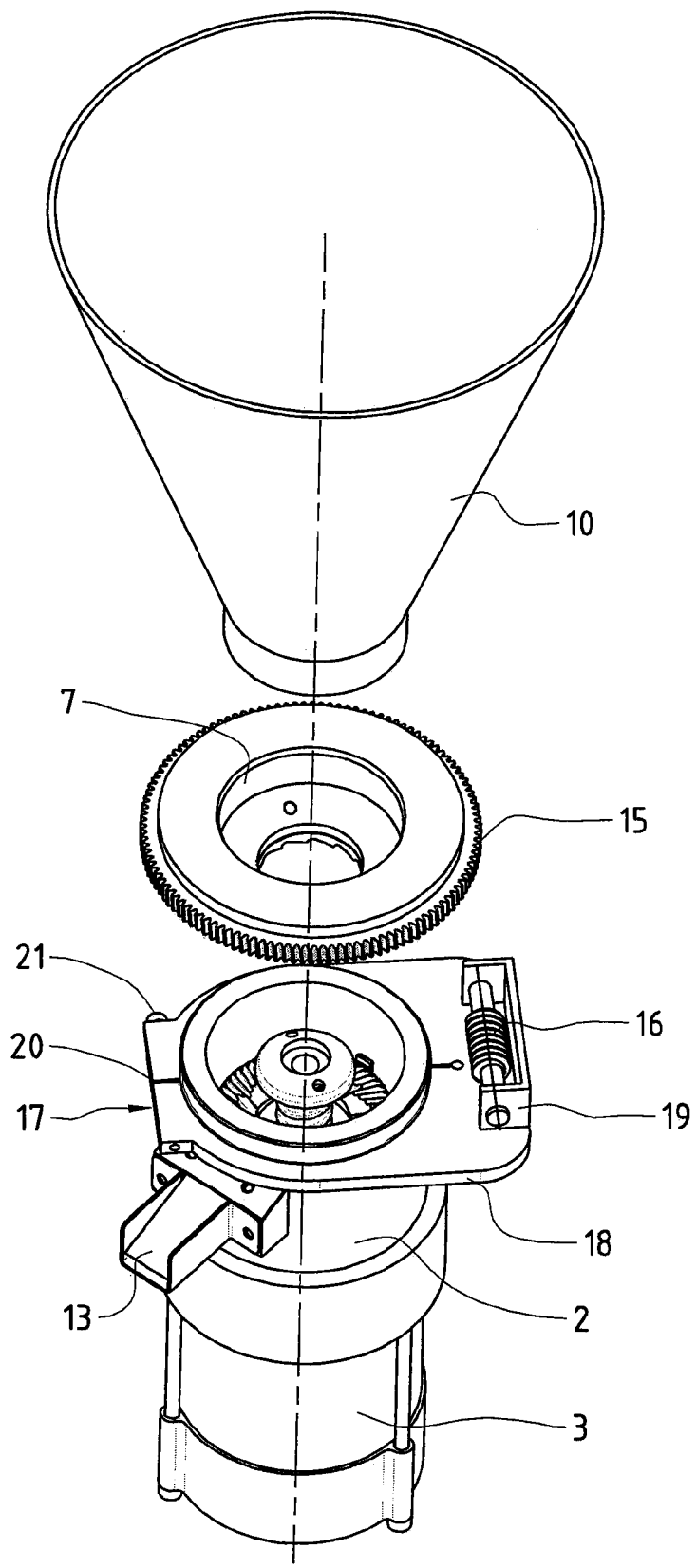
FIG. 2 shows in a three-dimensional representation the grinder according to FIG. 1 in taken-apart state.

FIG. 2 shows the housing 2 with the electromotor 3 attached thereto. Screwed out of the housing 2 is the screw-in part 7 with the drive wheel 15 attached thereon. Likewise screwed out of the screw-in part 7 is the funnel 10. Placed on the housing 2 is the annular holder 17, on which the setting wheel 16 is rotatably held. This annular holder 17 is designed as tension ring 18 in the embodiment example shown here. Attached on the one side of this tension ring 18 is a mounting bracket 19, in which the setting wheel 16 is rotatably held. On the side opposite the mounting bracket the tension ring is provided with a slot 20; in this region a tension screw 21 is inserted, by means of which the tension ring 18 is able to be fixed on the housing 2, whereby it is installed at a housing height such that the setting wheel 16 is able to engage in the drive wheel 15 in an optimal way.

Figure 3:
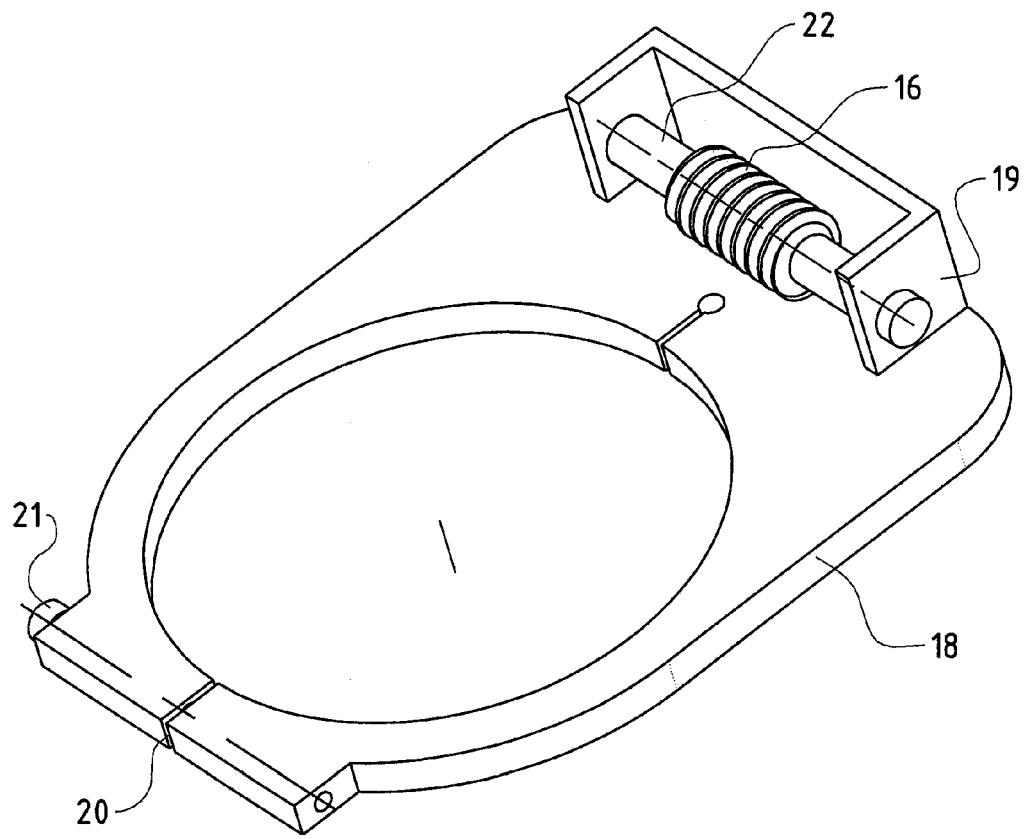
FIG. 3 shows a three-dimensional representation of the annular holder designed as tension ring.

FIG. 3 shows in an enlarged representation the tension ring 18, with installed mounting bracket 19, in which bracket the setting wheel 16 is rotatably borne, the slot 20 and the tension screw 21 inserted in the tension ring 18 in the region of the slot 20.

Rotation of the screw-in part 7 via the setting wheel 16 can be carried out by hand, for example, in that a hand wheel is attached to the shaft 22 of the setting wheel 16, which hand wheel projects through the housing of a coffee machine in which this grinder is inserted and via which hand wheel the setting wheel 16 can be turned. For this purpose a scale, for example, can be provided on this hand wheel on which scale the gap width of the grinding gap or the fineness of the ground coffee powder can be indicated, for instance.

As can be seen from FIGS. 4 and 5, this tension ring 18 can be put on in any desired angular position, in particular with respect to the path guide opening 13, and can be fixed via the tension screw; in the state of the grinder being inserted in a coffee machine, the setting wheel 16, with the drive mechanism installed, if applicable, can thereby be disposed where there is sufficient space.

Another embodiment of the invention can be seen in FIG. 6. The grinder 1 is constructed the same way as the previously described grinder, comprising a housing 2, on which the electromotor 3 is flange-mounted. Again this electromotor 3 drives the first grinding disc 6. The second grinding disc 9 is fixed on the screw-in part 7, which screw-in part is again screwable into the housing 2 via a threaded portion 8. Inserted in the threaded portion 8 is the funnel 10. In an identical way as in the previously described embodiment example, the coffee beans are led by the second grinding disc 9 into the grinding gap 12 for grinding. The ground coffee powder is brought into the path guide opening 13, from where the coffee powder can reach the brewing device of a coffee machine in a known way.

Fixed to the screw-in part 7 is once again a drive wheel 15, which co-operates with a setting wheel 16, via which setting wheel 16 the drive wheel 15 and consequently the screw-in part 7 can be rotated. Again the grinding gap 12 can be set by means of the rotation.

The setting wheel 16 is once again rotatably borne on a mounting bracket 19, which mounting bracket 19 is attached to the annular holder 17 that encloses the housing 2.

As can be seen in particular from FIG. 7, the annular holder 17 in this embodiment example consists of a ring 23 on which the mounting bracket 19 is fixed. In the mounting bracket 19 the setting wheel 16 is held in a way rotatable about the shaft 22. The shaft can thereby be provided, for example, with an opening 27, which is designed as hexagonal slot into which a plug-in tool with correspondingly designed plug-in shape can be inserted and with which the setting wheel 16 can be adjusted for setting the grinding gap width.

The annular surface 24 of the ring 23 is provided with a contoured pattern 25, which can be a tooth profile, for example. Provided on the underside of the housing 2 is a corresponding contoured pattern 26. When flange-mounting the electromotor on the housing 2, the annular holder 17 is inserted there-between. The contoured pattern 25 of the ring 23 then engages in the contoured pattern 26 of the housing. The ring 23 and thereby the mounting bracket 19 with the setting wheel 16 rotatably borne therein are connected to the housing 2 in a way secured against turning.

As can be seen from FIG. 8, when flange-mounting the electromotor 3 on the housing 2, the ring 23 inserted between electromotor 3 and housing 2 can be brought in position in such a way that the setting wheel 16 is situated at the correct angular position with respect to the path guide opening 13 in order to be at the correct place when inserting this grinder into a coffee machine. The electromotor 3 and the housing 2 can then be pushed together and connected to each other. The setting wheel 16 then comes into engagement with the drive wheel 15. The setting wheel 16 can thereby be brought into any desired position with respect to the path guide opening 13, as is shown in FIGS. 4 and 5, and is fixed in this position.

With this design for a grinder according to the invention, the setting wheel 16 can be brought into any desired angular position with respect to the housing 2 and in particular with respect to the path guide opening 13. The annular holder 17 is held in a fixed way in this angular position. This angular position can be selected in such a way that the setting wheel 16 can be accommodated in a place foreseen therefor in the coffee machine. A standardized grinder can thereby be inserted into coffee machines of different designs.

The invention claimed is:

1. A grinder for a coffee machine, comprising:
   a housing;
   a first grinding disc disposed in said housing;
   a drive that drives said first grinding disc about a rotational axis;
   a second grinding disc disposed in said housing;
   a threaded part in which said second grinding disc is attached said threaded part including threads enabling said threaded part to be screwable into said housing;
   a drive wheel disposed coaxially with respect to said threaded part that rotates said threaded part with respect to said housing, wherein a grinding gap between said first grinding disc and said second grinding disc is thereby able to be set;
   a setting wheel that co-operates with said drive wheel, said setting wheel being attached to said housing;
   a supply opening disposed in said housing for supply of coffee beans to be ground;
   a path guide opening for guiding away the coffee ground between said first grinding disc and said second grinding disc; and
   a holder that is adjustably attached to said housing and is fixable in any position, wherein said setting wheel is disposed on said holder.

2. The grinder according to claim 1, wherein said holder is annular and encloses said housing, said annular holder being rotatable with respect to said housing and fixable in any rotated set position.

3. The grinder according to claim 2, wherein said setting wheel is rotatably carried in a mounting bracket, said mounting bracket is being attached to said annular holder.

4. The grinder according to claim 2, wherein said annular holder is a tension ring, including tensioning means for tensioning said tension ring so as to fix said tension ring in the rotated set position.

5. The grinder according to claim 4, wherein said tensioning means comprises a tension screw that applies tension to said tension ring on a peripheral surface of said housing.

6. The grinder according to claim 2, wherein said annular holder is made up of a ring which is provided with a contoured pattern extending over at least a portion of a circumference of said ring, wherein a periphery of said housing has a corresponding contoured pattern that engages said contoured pattern of said ring.

7. The grinder according to claim 1, wherein said setting wheel includes a shaft with an opening at an end thereof by which said setting wheel can be turned.

8. The grinder according to claim 1 wherein said drive wheel is a worm wheel and and said setting wheel is a worm gear.

9. A grinder for a coffee machine, comprising:
   a housing including threads;
   a first grinding disc disposed in said housing;
   a drive that drives said first grinding disc about a rotational axis;
   a second grinding disc disposed in said housing;
   a threaded part in which said second grinding disc is attached, said threaded part including threads that engage said threads of said housing enabling said threaded part to be rotated relative to said housing;
   a drive wheel disposed coaxially with respect to said threaded part that rotates said threaded part with respect to said housing, wherein a grinding gap between said first grinding disc and said second grinding disc is thereby able to be set;
   a setting wheel that co-operates with said drive wheel, said setting wheel being attached to said housing;
   a supply opening disposed in said housing for supply of coffee beans to be ground;
   a path guide opening for guiding away the coffee ground between said first grinding disc and said second grinding disc; and
   an annular holder that encloses said housing, said annular holder being rotatable with respect to said-housing and fixable in any rotated set position, wherein said setting wheel is disposed on said annular holder.

* * * * *

UNITED STATES PATENT AND TRADEMARK OFFICE
CERTIFICATE OF CORRECTION

| | | |
|---|---|---|
| PATENT NO. | : 8,763,942 B2 | Page 1 of 1 |
| APPLICATION NO. | : 13/389831 | |
| DATED | : July 1, 2014 | |
| INVENTOR(S) | : Hergesell et al. | |

It is certified that error appears in the above-identified patent and that said Letters Patent is hereby corrected as shown below:

On the Title Page, item (75), "Inventors," please delete "Jochen Gussmann, Schwäbisch Gmüd(DE)" and replace with -- Jochen Gussmann, Schwäbisch Gmünd(DE) --

In the claims:

In column 6, line 11, please delete "and and" and replace with "and"

Signed and Sealed this
Seventh Day of October, 2014

Michelle K. Lee
*Deputy Director of the United States Patent and Trademark Office*